US006953533B2

(12) United States Patent
Kool et al.

(10) Patent No.: US 6,953,533 B2

(45) Date of Patent: Oct. 11, 2005

(54) PROCESS FOR REMOVING CHROMIDE COATINGS FROM METAL SUBSTRATES, AND RELATED COMPOSITIONS

(75) Inventors: Lawrence Bernard Kool, Clifton Park, NY (US); Kenneth Burrell Potter, Simpsonville, SC (US); William Randall Thompson, Greenville, SC (US); David Carr, Taylors, SC (US); Kiyokazu Watanabe, Yokosuka (JP); Minoru Ishida, Chiba-Ken (JP); Kazuharu Hattori, Tokyo (JP)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/462,049

(22) Filed: Jun. 16, 2003

(65) Prior Publication Data

US 2005/0115926 A1 Jun. 2, 2005

(51) Int. Cl.$^7$ .......................... B44C 1/22; C03C 15/00; C03C 25/68; C23F 1/00; C25F 3/00

(52) U.S. Cl. .......................................... 216/109; 134/3

(58) Field of Search ................................ 216/100, 101, 216/102, 103, 104, 108, 109; 134/2, 3, 41

(56) References Cited

U.S. PATENT DOCUMENTS

| | | | |
|---|---|---|---|
| 2,501,349 | A | 3/1950 | Nagel et al. |
| 3,373,114 | A | 3/1968 | Grunwald |
| 3,458,353 | A | 7/1969 | Baldi |
| 3,514,407 | A | 5/1970 | Missel |
| 3,607,398 | A | 9/1971 | Lucas |
| 3,622,391 | A | 11/1971 | Baldi |
| 3,779,879 | A | 12/1973 | Scott |
| 3,833,414 | A | 9/1974 | Grisik et al. |
| 3,986,970 | A | 10/1976 | Shiga |
| 4,004,956 | A | 1/1977 | Brindisi, Jr. |
| 4,148,936 | A | 4/1979 | Grisik et al. |
| 4,339,282 | A | 7/1982 | Lada et al. |
| 4,425,185 | A | 1/1984 | Fishter et al. |
| 5,585,086 | A | 12/1996 | McCullough et al. |
| 5,674,610 | A | 10/1997 | Schaeffer et al. |
| 5,962,145 | A | 10/1999 | Matsukawa |
| 6,283,715 | B1 | 9/2001 | Nagaraj et al. |

FOREIGN PATENT DOCUMENTS

| | | |
|---|---|---|
| EP | 1050604 | 5/2000 |
| EP | 1162286 A1 * | 12/2001 |
| GB | 2026038 | 1/1980 |
| GB | 2115013 | 9/1983 |
| JP | 56096083 | 8/1981 |
| WO | 9113186 | 9/1991 |
| WO | 9303198 | 2/1993 |

OTHER PUBLICATIONS

U.S. Appl. No. 09/591,531, filed Jul. 9, 2000, James A. Ruud et al.

* cited by examiner

*Primary Examiner*—P. Hassanzadeh
*Assistant Examiner*—Roberts Culbert
(74) *Attorney, Agent, or Firm*—Ann M. Agosti; Patrick K. Patnode

(57) ABSTRACT

A method for removing a chromide coating from the surface of a substrate is described. The coating is treated with a composition which includes an acid having the formula $H_xAF_6$, where "A" can be Si, Ge, Ti, Zr, Al, or Ga; and x is 1–6. An exemplary acid is hexafluorosilicic acid. The composition may also include a second acid, such as phosphoric acid or nitric acid. In some instances, a third acid is employed, such as hydrochloric acid. A related repair method for replacing a worn or damaged chromide coating is described. The coating is often applied to portions of turbine engine components made from superalloy materials.

27 Claims, No Drawings

PROCESS FOR REMOVING CHROMIDE COATINGS FROM METAL SUBSTRATES, AND RELATED COMPOSITIONS

BACKGROUND OF THE INVENTION

In a general sense, this invention relates to protective coatings for metal substrates. More specifically, it pertains to methods and compositions useful for removing chromide coatings from high temperature substrates, e.g., turbine engine components.

Metal alloys are often used in industrial environments which include extreme operating conditions. As an example, gas turbine engines are often subjected to repeated thermal cycling during operation. The standard operating temperature of turbine engines continues to be increased, to achieve improved fuel efficiency. In a turbine engine, blades and vanes are arranged in stages according to the pressure and temperature of exhaust gasses which impinge upon them.

The turbine engine components (as well as other industrial parts) are often formed of superalloys, which can withstand a variety of extreme operating conditions. The superalloys are strong, creep-resistant, and fatigue-resistant. However, they are still susceptible to progressive damage by oxidation, hot corrosion, and erosion, when exposed to the hot combustion gasses which flow through the turbine. Therefore, the components are usually covered with various types of protective coatings.

Different protective coatings are used for components in the various stages of the turbine engine. Usually, thermal barrier coating (TBC) systems or aluminum-containing coatings are employed in the high-pressure stages. Chromide coatings are often favored for the low-pressure stages of the turbine, which are typically exposed in service to intermediate-range temperatures.

The protective coatings are usually applied during fabrication of the turbine components. Many techniques are available for applying the coatings, such as "pack processes" or some form of vapor deposition. U.S. Pat. Nos. 4,148,936 and 6,283,715 describe several of the deposition techniques for chromide coatings. As mentioned below, the chromium layer usually interdiffuses with the base metal in the substrate.

The protective coatings on turbine engines can degrade during service, due to continued exposure to hot exhaust gasses and temperature changes during the operating cycles of the engine. Moreover, the coatings can be damaged during handling, in the course of manufacturing, installation, and inspection. Thus, it is sometimes necessary to repair the components, particularly airfoils, and return those components to service.

During repair, the protective coatings (e.g., the chromide coatings) are often removed to allow inspection and repair of the underlying substrate. Removal is typically carried out by immersing the component in a stripping solution. In the past, common stripping solutions were based on one or more strong mineral acids (e.g., hydrochloric acid, sulfuric acid, nitric acid, and hydrofluoric acid), as well as other additives.

The prior art stripping compositions are sometimes effective for removing chromide coatings from turbine substrates. However, there are some disadvantages to their use. For example, the mineral acid compositions often emit an excessive amount of hazardous, acidic fumes. Due to environmental, health and safety concerns, such fumes must be scrubbed from ventilation exhaust systems.

Moreover, the mineral acid compositions tend to attack the substrate, pitting the base metal. The mineral acid-based processes are generally non-selective, and can result in undesirable loss of the substrate material. This material loss can lead to changes in critical dimensions, e.g., turbine airfoil wall thickness. The material loss can also lead to structural degradation of the substrate alloy, e.g., by way of intergranular attack.

Furthermore, the chromide coatings sometimes have a great deal of adherence to the substrate, and are not effectively removed with the strong mineral acids. In those instances, other techniques must be employed, such as grit blasting. However, grit blasting is a labor-intensive process that is usually carried out on a piece-by-piece basis. Special care must sometimes be taken, to prevent grit-blasting damage to the substrate or any protective coating not being removed during the turbine component overhaul.

In view of some of the drawbacks of the prior art, new processes for removing chromide coatings from metal substrates would be welcome in the art. The processes should be capable of removing substantially all of the coating material, while not attacking the substrate itself. It would also be desirable if the processes did not result in the formation of an unacceptable amount of hazardous fumes.

In some instances, the processes should also be compatible with processes being used to remove other coatings from the component, e.g., metallic overlay coatings. The processes should also exhibit some degree of selectivity. For example, they should effectively remove the chromide coating while substantially preserving the substrate.

BRIEF DESCRIPTION OF THE INVENTION

One embodiment of this invention is directed to a method for removing a chromide coating from the surface of a substrate. A typical substrate is a turbine engine component made from a superalloy. The method includes the step of contacting the coating with an aqueous composition which comprises an acid having the formula $H_xAF_6$, or precursors to said acid. "A" in the formula is selected from the group consisting of Si, Ge, Ti, Zr, Al, and Ga; and x is 1–6.

As used herein, a "chromide coating" is one which contains chromium, and is applied to the substrate in excess of any amount which may be present in the substrate alloy. These coatings are sometimes referred to as "chromium coatings", and are described in various references. Non-limiting examples include U.S. Pat. Nos. 4,148,936; 5,674,610; and 6,283,715, all of which are incorporated herein by reference. For example, as described in U.S. Pat. No. 6,2830,715, in one embodiment, the composition of the chromide coating comprises an average composition of from about 20 to about 30 weight percent chromium, balance interdfffused elements of the base metal, and impurities. The coating may include other modifying constituents co-deposited with the chromium, such as silicon and various activators. Moreover, as used herein, the term chromide coatings is meant to also include chromium carbide coatings.

It should also be understood that chromide coatings typically become oxidized during service—especially when exposed to elevated temperatures. Thus, chromium oxide coatings are also considered to be part of the coating definition herein. Furthermore, a chromide coating in service usually includes a concentration of the elements present in the substrate, as a result of interdiffusion of the coating and substrate. (However, the chromide layer retains some attributes of the original coating material, e.g., pure chromium regions and/or chromium-rich phases).

The thickness of the chromide coating will depend on various factors, such as the type of article being coated, the deposition technique employed; the composition of the substrate, and the environmental conditions to which the article will be subjected. In the case of metal-based substrates such as superalloys, the chromide coating usually has a thickness, as applied, in the range of about 0.5 mil (12.7 microns) to about 2 mils (50.8 microns), although this range can vary considerably. A diffusion region (i.e., as a result of the interdiffusion discussed above) will usually exist to a substrate depth of up to about 3 mils (76.2 microns), depending in part on temperature exposure.

The $H_xAF6$ compound, sometimes referred to herein as the "primary acid", is preferably $H_2SiF_6$ or $H_2ZrF_6$. Very often, the treatment composition includes at least one additional acid. The additional or "second acid" is preferably nitric acid or a phosphorous-containing compound such as phosphoric acid.

In some embodiments, the composition includes a third acid, which is usually a mineral acid (i.e., in addition to the nitric acid which might be used). Mineral acids such as hydrochloric acid are useful in enhancing removal of chromide coating material that has diffused into the substrate. However, they are used at relatively small levels, as described below, so as not to adversely affect the substrate.

In many embodiments, the method of this invention has a very desirable degree of selectivity. In other words, the chromide coating can be effectively removed, without adversely affecting the substrate. As alluded to above, this is an important advantage for substrates which require close dimensional tolerances and a high level of structural integrity. Moreover, the treatment composition described herein is relatively benign, from an environmental standpoint, as compared to mineral acid-based compositions.

As used herein, the term "removal of the coating" is meant to refer to the severe degradation of the coating, leaving (at most) only a coating residue which weakly adheres to the underlying surface. The residue is easily removed by a subsequent, conventional technique such as "de-smutting", as discussed below.

Another embodiment of the invention is directed to a method for replacing a worn or damaged chromide coating applied over a substrate. As described herein, this method is especially useful for stripping and then reapplying coatings at remote locations where full-size deposition equipment may not be available. The chromide coating being replaced is first stripped, using the $H_xAF6$-based composition described herein. The new coating is then applied by one of the conventional techniques known in the art.

Other features and advantages of the present invention will be apparent from the following detailed description.

DETAILED DESCRIPTION OF THE INVENTION

As mentioned previously, the aqueous composition for this invention includes an acid having the formula $H_xAF_6$. In this formula, A is selected from the group consisting of Si, Ge, Ti, Zr, Al, and Ga. The subscript x is a quantity from 1 to 6, and more typically, from 1 to 3. Materials of this type are available commercially, or can be prepared without undue effort. The preferred acids are $H_2SiF_6$, $H_2ZrF_6$, or mixtures thereof. In some embodiments, $H_2SiF_6$ is especially preferred. The last-mentioned material is referred to by several names, such as "fluosilicic acid", "hydrofluosilicic acid", "fluorosilicic acid", and "hexafluorosilicic acid".

Precursors to the $H_xAF_6$ acid may also be used. As used herein, a "precursor" refers to any compound or group of compounds which can be combined to form the acid or its dianion $AF_6^{-2}$, or which can be transformed into the acid or its dianion under reactive conditions, e.g. the action of heat, agitation, catalysts, and the like. Thus, the acid can be formed in situ in a reaction vessel, for example.

As one illustration, the precursor may be a metal salt, inorganic salt, or an organic salt in which the dianion is ionically bound. Non-limiting examples include salts of Ag, Na, Ni, K, and $NH_4$+, as well as organic salts, such as a quaternary ammonium salt. Dissociation of the salts in an aqueous solution yields the acid. In the case of $H_2SiF_6$, a convenient salt which can be employed is $Na_2SiF_6$.

Those skilled in the art are familiar with the use of compounds which cause the formation of $H_xAF_6$ within an aqueous composition. For example, $H_2SiF_6$ can be formed in situ by the reaction of a silicon-containing compound with a fluorine-containing compound. An exemplary silicon-containing compound is $SiO_2$, while an exemplary fluorine-containing compound is hydrofluoric acid (i.e., aqueous hydrogen fluoride).

When used as a single acid, the $H_xAF_6$ acid can be somewhat effective for removing the chromide coating. The preferred level of acid employed will depend on various factors, such as the type and amount of coating being removed; the location of the coating material on a substrate; the type of substrate; the thermal history of the substrate and coating (e.g., the level of interdiffusion); the technique by which the substrate is being exposed to the treatment composition (as described below); the time and temperature used for treatment; and the stability of the acid in solution.

In general, the $H_xAF_6$ acid is present in a treatment composition at a level in the range of about 0.05 M to about 5 M, where M represents molarity. (Molarity can be readily translated into weight or volume percentages, for ease in preparing the solutions). Usually, the level is in the range of about 0.2 M to about 3.5 M. In the case of $H_2SiF_6$, a preferred concentration range is often in the range of about 0.2 M to about 2.2 M. (Longer treatment times and/or higher treatment temperatures, described below, may compensate for lower levels of the acid, and vice versa.). Adjustment of the amount of $H_xAF_6$ acid, and of other components described below, can readily be made by observing the effect of particular compositions on coating removal from the substrate.

In preferred embodiments, the treatment composition also includes at least one additional acid, or precursor thereof. The additional acid is usually a phosphorous-containing compound, or nitric acid. Non-limiting examples of the phosphorous compounds include phosphoric acid and phosphorous acid, as well as mixtures thereof. In general, the phosphorous compounds are commercially available, as is nitric acid. These compounds can also be synthesized by well-known techniques.

Those skilled in the art can select the most appropriate additional acid, based on observed effectiveness and other factors, such as availability, compatibility with the primary acid, cost, and environmental considerations. Moreover, a precursor of the acid may be used (e.g., a salt), as described above in reference to the primary acid. For most embodiments, the preferred additional acid is a phosphorous compound, with phosphoric acid being especially preferred.

The present inventors do not wish to be bound to any particular theory in regard to the unexpected efficacy of the phosphorous compounds and nitric acid. However, they appear to provide the acidic capacity to rapidly oxidize the chromium in the chromide coating. This in turn appears to induce the chromide material to become solubilized, and to readily detach from the substrate surface region.

The amount of additional acid employed (i.e., the phosphorous compound or nitric acid) will depend on the acid itself, as well as the identity of the primary acid, and on many of the factors set forth above. Phosphorous compounds are usually present in the composition at a level in the range of about 0.1 M to about 20 M. In some preferred embodiments (e.g., in the case of phosphoric acid), the preferred range is from about 0.5 M to about 5 M. Furthermore, some especially preferred embodiments contemplate a range of about 2 M to about 4 M.

When present as the additional acid, nitric acid is present at a level which will minimize degradation of substrates being treated according to this invention. Usually that level will be no greater than about 1.2 M. In preferred embodiments, the range will be from about 0.3 M to about 1 M.

In some embodiments, the treatment composition includes a minor amount of a third acid. This constituent is usually a strong acid, having a pH of less than about 3.5 in pure water. Thus, the third acid can be nitric acid, i.e., when the second acid is a phosphorous compound. Non-limiting examples of other strong acids are sulfuric acid, hydrochloric acid, hydrofluoric acid, hydrobromic acid, hydriodic acid, perchloric acid, alkyl sulfonic acids, and mixtures of any of the foregoing. The strong acid appears to be especially useful for removing portions of the chromide coating which may have diffused into the substrate—especially a superalloy substrate substantially depleted of chromium.

In preferred embodiments, the third acid is selected from the group consisting of hydrochloric acid, nitric acid, and mixtures thereof. Hydrochloric acid is especially preferred. (Usually, the acid is advantageously supplied and used in aqueous form, e.g., 35–38% hydrochloric acid in water).

The amount of third acid employed will depend on the identity of the primary acid and the second acid, and on many of the factors set forth above. To minimize degradation of some substrates, the third acid is preferably present at the levels described above, in regard to nitric acid. Thus, the concentration of the acid in the treatment composition is usually no greater than about 1.2 M, and preferably in the range of about 0.3 M to about 1 M. Experiments can be readily carried out to determine the most appropriate level for the third acid. (The process of the present invention is generally free of the problems associated with prior art processes which required relatively large amounts of strong acids, as described previously).

The aqueous composition of the present invention may include various other additives which serve a variety of functions. Non-limiting examples of these additives are inhibitors, dispersants, surfactants, chelating agents, wetting agents, deflocculants, stabilizers, anti-settling agents, reducing agents, and anti-foam agents. Those of ordinary skill in the art are familiar with specific types of such additives, and with effective levels for their use. An example of an inhibitor for the composition is a relatively weak acid like acetic acid. Such a material tends to lower the activity of the primary acid in the composition. This is desirable in some instances, e.g., to decrease the potential for pitting of the surfaces of some types of substrates, if contacted with the treatment composition.

Various techniques can be used to treat the substrate with the aqueous composition. For example, the substrate can be continuously sprayed with the composition, using various types of spray guns. A single spray gun could be employed. Alternatively, a line of guns could be used, and the substrate could pass alongside or through the line of guns (or multiple lines of guns). In another alternative embodiment, the oxide-removal composition could be poured over the substrate (and continuously recirculated).

In preferred embodiments, the substrate is immersed in a bath of the aqueous composition. Immersion in this manner (in any type of vessel) often permits the greatest degree of contact between the aqueous composition and the chromide material being removed. Immersion time and bath temperature will depend on various factors, some of which were described above. They include: the particular type of chromide material being removed, the acid (or acids) being used in the bath, and equipment capabilities. Usually, the bath is maintained at a temperature in the range of about room temperature to about 100° C., while the substrate is immersed therein. In preferred embodiments, the temperature is maintained in the range of about 45° C. to about 95° C.

The immersion time in the bath may vary considerably. It is usually in the range of about 10 minutes to about 72 hours, and preferably, from about 1 hour to about 20 hours. Longer immersion times may compensate for lower bath temperatures.

Treatment of the article in the stripping bath severely degrades the integrity of the coating being removed. The degraded coating is referred to herein as "smut" or "coating residue". The coating residue (e.g., of a full coating or of an uppermost sublayer of a coating) often continues to weakly adhere to the underlying substrate (or sublayer). Consequently, the treatment is usually followed by a post-stripping step, often referred to as a "de-smutting" operation. Such a step is known in the art, and described in various references. It may be in the form of a gentle abrasion step which minimizes damage to the substrate or the underlying sublayer. As one example, a grit-blasting can be carried out by directing a pressurized air stream containing aluminum oxide particles across the surface. The air pressure is usually less than about 100 psi. The grit-blasting is carried out for a time period sufficient to remove the degraded coating. The duration of grit-blasting in this embodiment will depend on various factors, such as the thickness and specific composition of the smut layer; the size and type of grit media, and the like. The process is typically carried out for about 30 seconds to about 3 minutes.

Other known techniques for abrading the surface may be used in lieu of grit-blasting. For example, the surface can be manually scrubbed with a fiber pad, e.g. a pad with polymeric, metallic, or ceramic fibers. Alternatively, the surface can be polished, e.g., with a flexible wheel or belt in which alumina or silicon carbide particles have been embedded. Liquid abrasive materials may alternatively be used on the wheels or belts. These alternative techniques would be controlled in a manner that maintained a contact force against the surface that was no greater than the force used in the grit-blasting technique discussed above.

Other techniques (or combinations of techniques) could be employed in place of abrasion, to remove the degraded material. Examples include tumbling of the article (e.g., water-tumbling), or laser ablation of its surface. Alternatively, the degraded material could be scraped off the surface. As still another alternative, sound waves (e.g., ultrasonic) could be directed against the surface, causing vibrations which can shake loose the degraded material. For each of these alternative techniques, those skilled in the art would be familiar with operating adjustments which are made to control the relevant force applied against the surface of the article (as in the case of the abrasion technique), to minimize damage to the substrate or coating sublayer being preserved. The article is sometimes rinsed after this step, e.g., using water or a combination of water and a wetting agent.

The chromide coating being removed by this process is one which has been applied on a variety of metallic substrates. As used herein, "metallic" refers to substrates which are primarily formed of metal or metal alloys, but which may also include some non-metallic components. Non-limiting examples of metallic materials are those which comprise at least one element selected from the group consisting of iron, cobalt, nickel, aluminum, chromium, titanium, and mixtures which include any of the foregoing (e.g., stainless steel).

Very often, the metallic material is a superalloy. The superalloy is typically nickel-, cobalt-, or iron-based, although nickel- and cobalt-based alloys are favored for high-performance applications. Illustrative nickel-base superalloys include at least about 40 wt % Ni, and at least one component from the group consisting of cobalt, chromium, aluminum, tungsten, molybdenum, titanium, and iron. Illustrative cobalt-base superalloys include at least about 30 wt % Co, and at least one component from the group consisting of nickel, chromium, aluminum, tungsten, molybdenum, titanium, and iron.

An important aspect of some embodiments of this invention relates to selectivity. In other words, the process effectively removes the chromide coating, while leaving the underlying substrate substantially unaffected. As described previously, this attribute can be critical in preserving the integrity and dimensions of the component.

An additional advantage of the process described herein is that the treatment solution is effective for also removing coatings other than the chromides. As an example, turbine engine components are often protected by diffusion coatings (e.g., aluminide), or overlay coatings, such as MCrAl(X). (In that formula, M is at least one of Ni, Co, Fe; while X is at least one of Y, Ta, Si, Hf, Ti, Zr, B, C.) As described in pending patent application Ser. No. 09/591,531, filed on Jun. 9, 2000 (J. Ruud et al) and incorporated herein by reference, these coatings can be effectively stripped from a substrate by contact with an $H_xAF_6$-based composition. Thus, a component with different types of these coatings on different surfaces can be immersed in a bath of the same treatment solution, effectively stripping all of the coatings from various surfaces. The use of a single treatment bath is a very desirable attribute in an industrial setting—especially when coating repair is being undertaken at a site remote from an original manufacturing location.

As alluded to previously, the method of the present invention may be used in conjunction with a process for repairing worn or damaged chromide coatings on metal substrates, e.g., turbine engine parts. The worn or damaged chromide coating is first removed by the process described above, i.e., utilizing the $H_xAF_6$-based composition. A new chromide coating can then be applied to the substrate. As alluded to above, many techniques are available for applying the coating. U.S. Pat. No. 5,674,610, incorporated herein by reference, described one such method. In that disclosure, a chromide coating is applied by providing a solid source of chromium and a solid reactant. The solid reactant is capable of reacting with the chromium at elevated temperatures, to produce a gaseous chromium-containing compound, which deposits on the substrate. The reactants are sometimes supplied in the form of a coating tape, which is very useful for applying localized coatings under field-repair conditions.

It should be apparent from the preceding description that another embodiment of this invention is directed to a stripping composition for removing a chromide coating from a substrate surface. As described herein, the surface is often a component of a turbine engine, e.g., a blade or "bucket". The treatment composition includes the $H_xAF6$ compound described above. In preferred embodiments, the composition also includes the phosphorous-containing compound, and limited amounts of a strong acid like hydrochloric acid. Various other additives can be present in the composition. It is typically used in the form of bath, in which the part being treated is immersed.

EXAMPLES

The example which follows is merely illustrative, and should not be construed to be any sort of limitation on the scope of the claimed invention.

A treatment composition within the scope of this invention was used to strip a chromide coating from the surface of a gas turbine blade (i.e., a Stage 3 bucket, made of a standard, nickel-base superalloy). The chromide coating had previously been applied to the blade by conventional techniques. As applied, the coating had an approximate thickness of about 0.5–2 mils (13–51 microns). The turbine blade had subsequently been in service for more than 20,000 hours, and had been subjected to temperatures of at least about 500° C. This exposure resulted in the formation of a diffusion region within the substrate, as generally described above. (As also described previously, the high-temperature exposure transformed at least some of the coating metal into various oxide species, e.g., chromium oxides).

The turbine bucket was immersed in a bath of the treatment composition. The approximate contents of the bath was as follows: 71.25 volume % fluorosilicic acid (23 wt % concentration), 23.75 volume % phosphoric acid (86 wt % concentration), and 5 volume % hydrochloric acid (37.5 wt % concentration). During treatment, the bath was stirred, and maintained at a temperature of about 80° C.

After about 10 hours, the bucket was rinsed, and examined. Substantially all of the chromide coating had been removed from the surface and the diffused regions, and only a small amount of black smut continued to adhere to the part. The smut was removed by means of gentle polishing. The base superalloy did not appear to be attacked or adversely affected by the treatment process.

While this invention has been described in terms of preferred embodiments, it is apparent that one skilled in the art could adopt other forms. Accordingly, the scope of this invention is to be limited only by the following claims.

What is claimed is:

1. A method for removing a chromide coating from the surface of a metallic substrate, comprising the step of contacting the coating with an aqueous composition which comprises an acid having the formula $H_xAF_6$, or precursors to said acid, wherein A is selected from the group consisting of Si, Ge, Ti, Zr, Al, and Ga; and x is 1–6, wherein the chromide coating comprises an average composition of from about 20 to about 30 weight percent chromium, balance interdiffused elements of the base metal, and impurities.

2. The method of claim 1, wherein x is 1–3.

3. The method of claim 1, wherein the acid is present at a level in the range of about 0.05 M to about 5 M.

4. The method of claim 3, wherein the acid is present at a level in the range of about 0.2 M to about 3.5 M.

5. The method of claim 1, wherein the precursor is a salt of the acid.

6. The method of claim 1, wherein the aqueous composition comprises the compound $H_2SiF_6$ or $H_2ZrF_6$.

7. The method of claim 1, wherein the aqueous composition further comprises at least one additional acid or precursor thereof.

8. The method of claim 7, wherein the additional acid is selected from the group consisting of nitric acid and a phosphorous-containing compound.

9. The method of claim 8, wherein the phosphorous-containing compound is selected from the group consisting of phosphoric acid, phosphorous acid, and mixtures thereof.

10. The method of claim 9, wherein the phosphorous-containing compound is present in the composition at a level in the range of about 0.1 M to about 20 M.

11. The method of claim 10, wherein the phosphorous-containing compound is phosphoric acid.

12. The method of claim 11, wherein the phosphoric acid is present at a level in the range of about 0.5 M to about 5 M.

13. The method of claim 8, wherein the nitric acid is present at a level in the range of about 0.3 M to about 1 M.

14. The method of claim 8, wherein the aqueous composition comprises a third acid, or precursor thereof.

15. The method of claim 14, wherein the third acid has a pH of less than about 3.5 in pure water.

16. The method of claim 15, wherein the third acid is selected from the group consisting of sulfuric acid, hydrochloric acid, hydrofluoric acid, hydrobromic acid, hydriodic acid, perchloric acid, alkyl sulfonic acids, and mixtures of any of the foregoing.

17. The method of claim 15, wherein the third acid is present in the composition at a level which is no greater than about 1.2 M.

18. The method of claim 15, wherein the third acid is hydrochloric acid, or a precursor thereof.

19. The method of claim 1, wherein the substrate is immersed in a bath of the aqueous composition.

20. The method of claim 19, wherein the bath is maintained at a temperature in the range of about room temperature to about 100° C., while the substrate is immersed therein.

21. The method of claim 1, wherein the metallic substrate comprises at least one element selected from the group consisting of iron, cobalt, nickel, aluminum, chromium, titanium, and mixtures which include any of the foregoing.

22. The method of claim 21, wherein the metallic substrate comprises a superalloy material.

23. A method for removing a chromide coating from the surface of a superalloy substrate, comprising the step of immersing the substrate in an aqueous composition which comprises (a) about 0.05 M to about 5 M of an acid having the formula $H_xAF_6$, wherein A is selected from the group consisting of Si, Ge, Ti, Zr, Al, and Ga; and x is 1–6, (b) about 0.1 M to about 20 M of a phosphorous containing compound or mixture thereof, and (c) about 0.3 M to about 1 M of hydrochloric acid or nitric acid; wherein the chromide coating comprises an average composition of from about 20 to about 30 weight percent chromium, balance interdiffused elements of the base metal, and impurities.

24. The method of claim 23, wherein component (a) is $H_2SiF_6$ or $H_2ZrF_6$; component (b) is phosphoric acid; and component (c) is hydrochloric acid.

25. The method of claim 23, wherein the substrate is a portion of a gas turbine engine.

26. A method for replacing a worn or damaged chromide coating applied over a substrate, comprising the following steps:

(i) removing the worn or damaged chromide coating from the substrate, by contacting the coating with an aqueous composition which comprises an acid having the formula $H_xAF_6$, or precursors to said acid, wherein A is selected from the group consisting of Si, Ge, Ti, Zr, Al, and Ga; and x is 1–6; and then (ii) applying a new chromide coating over the substrate, wherein the chromide coating comprises an average composition of from about 20 to about 30 weight percent chromium, balance interdiffused elements of the base metal, and impurities.

27. The method of claim 26, wherein the substrate is a turbine engine component, and the aqueous composition comprises:

(a) about 0.05 M to about 5 M of an acid having the formula $H_xAF_6$, wherein A is selected from the group consisting of Si, Ge, Ti, Zr, Al, and Ga; and x is 1–6, (b) about 0.1 M to about 20 M of a phosphorous-containing compound, and (c) about 0.3 M to about 1 M of hydrochloric acid or nitric acid.

* * * * *